Jan. 18, 1955
E. R. HAURY
2,699,575
APPARATUS FOR MAKING RUBBER HOSE
Filed June 11, 1951
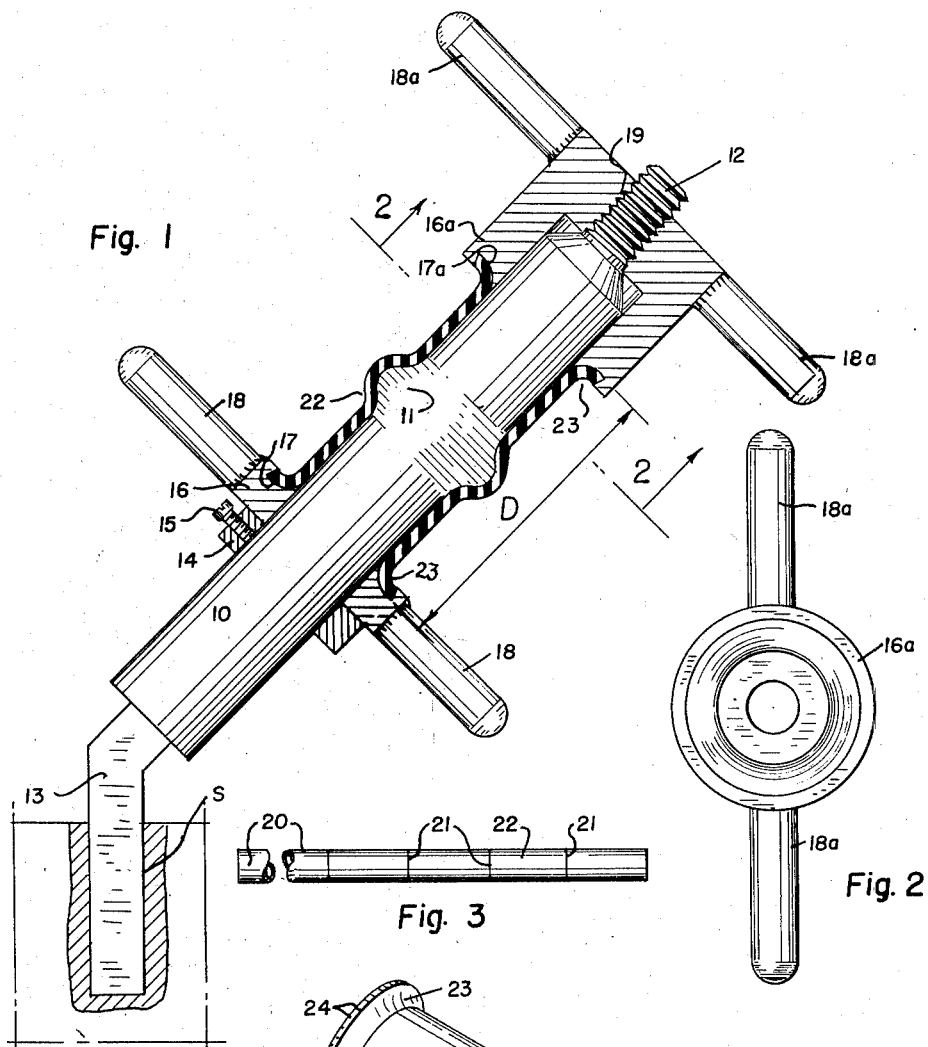
Inventor
EARL R. HAURY
By
Anderson & Muller
Attorneys

United States Patent Office 2,699,575
Patented Jan. 18, 1955

2,699,575

APPARATUS FOR MAKING RUBBER HOSE

Earl R. Haury, Denver, Colo., assignor to The Gates Rubber Company, Denver, Colo., a corporation of Colorado Application June 11, 1951, Serial No. 230,938

8 Claims. (Cl. 18—45)

This invention relates to rubber hose and more particularly to a hose of predetermined length having flanges at the ends thereof.

One of the objects of the invention is to provide novel methods for making the hose aforesaid.

Another object is to provide novel apparatus for practising the method.

A further object is to provide a hose formed by the novel method.

Further objects, advantages, and salient features will become more apparent from the description to follow, the appended claims, and the accompanying drawing, in which:

Figure 1 is a side elevation of a mandrel employed in practising the method, portions associated therewith and a hose thereon being shown in longitudinal section and a portion of its holding means being broken away;

Figure 2 is an end elevation of one of the abutments employed with the mandrel, as viewed in the direction of arrows 2, when it is removed from the mandrel;

Figure 3 is a side elevation of a long length of semi-cured vulcanizable hose to be processed into the finished articles of manufacture;

Figure 4 is a perspective of one form of finished article of manufacture, a portion of the wall being broken away; and Figure 5 is a vulcanizing steam chamber, or autoclave, a portion being broken away.

Referring in detail to the drawing, and particularly Figures 1 and 2, the apparatus comprises a cylindrical mandrel 10 having a member 13 welded or otherwise secured thereto for holding and handling the apparatus, this member being square in cross-section, or other suitable shape to be received in a suitable socket S or other holding means.

A circular collar 14, adjustable along the mandrel, is secured thereto by a set screw 15 and a hose abutment member 16 abuts the collar, this member having a circular groove 17 in one face thereof which is the same shape, in cross-section, as the cross-section of the finished hose flange. Handles 18, for moving member 16, are welded or otherwise secured to the abutment member. Another abutment member 16a is disposed on the mandrel, this member having a threaded aperture 19 engaging threaded portion 12. It is provided with a groove 17a and handles 18a, similar to groove 17 and handles 18, respectively.

In performing the method a long length of rubber-like hose 20 (see Figure 3) is built up in any conventional manner and semi-cured. It is then transversely cut along lines 21, the lengths of the sections 22 being in excess of the distance D a sufficient amount to form the flanges 23 at the ends of the hose. With member 16a removed from the mandrel a section 22 is slipped over the mandrel until one end thereof abuts member 16. Member 16a is then applied to the mandrel, and as it is rotated by its handles 18a and moved axially of the mandrel the ends of the hose flare outwardly into grooves 17, 17a and form the flanges. A plurality of mandrels, loaded as described, are then transferred to a suitable curing chamber, such as steam chamber 26, and maintained at curing temperature to complete the cure. After being cured, member 16a is removed from the mandrel and member 16 is moved axially, by handles 18 thereon, toward bulge 11, thus partially stripping the finished hose from the mandrel. When member 16 is moved to its limit the hose may then be easily stripped from the mandrel.

The hose may be made entirely of rubber, either natural or synthetic, or any combination thereof, or be reinforced with suitable fabric-like material. A reinforcing material found to be well suited to the method is shown in Figure 4 wherein one or more layers or parallel cords 24, similar to those employed in cord tires, are disposed spirally within the hose wall. This material being weftless, or having weak weft threads, permits the hose wall to deform over bulge 11 and also permits the cords to deform radially outward when the flanges are being formed on the mandrel.

The bulged wall portion between the ends of the hose permits the hose to readily flex between its ends when the flanges are secured to liquid connections, much in the same manner as disclosed in the patent to Stivason, 2,395,144. It will be apparent, however, that the bulge is not essential to the invention in its broadest aspect and when not desired the bulged portion of the mandrel is merely omitted, the flanges being formed in the same manner described. Also, the semi-cure of the length of hose before being formed into the finished article is not essential to the invention in its broadest aspects, this semi-cure being only an expedient to facilitate the handling of the material.

By the present method, the building up of each hose on a mandrel, as previously practised, is obviated and also the subsequent cure in a mold surrounding the hose. This, of course, not only reduces cost of equipment but the finished hoses may be constructed more rapidly and economically because of the smaller amount of hand work involved.

Many modifications within the purview of the invention will become apparent to those skilled in the art and the illustrated embodiment is therefore to be considered as exemplary only, the invention not being limited thereto except as defined by the scope of the appended claims.

I claim:

1. Apparatus for making a hose having an integral outwardly flaring flange at an end thereof, comprising: a mandrel over which a vulcanizable rubber like hose may be disposed with the mandrel in engagement with the inner surface of the hose wall, a first abutment member slidably mounted on the mandrel, means for latching said abutment member in a selected position along the mandrel to resist movement in one direction, one side of said abutment having an outwardly flaring flange forming surface surrounding the mandrel, a second abutment member surrounding an end of the mandrel in position to engage one end of a section of hose positioned on the mandrel between said abutments, and means comprising a threaded interconnection between the second abutment and the mandrel to move the second abutment towards the first abutment to cause the end of the hose in contact with the first abutment to move outwardly along the flange forming surface thereof.

2. Apparatus for making a hose having an integral outwardly extending flange at each end thereof, comprising; a mandrel over which a vulcanizable rubber like hose may be disposed with the mandrel in engagement with the inner wall of the hose at least adjacent opposite ends thereof, a first abutment member on the mandrel having an outwardly flaring flange forming surface surrounding the mandrel adapted to abut one end of the hose and distort the hose wall adjacent one end thereof outwardly onto said flaring surface when the hose is forced thereagainst, a second similar abutment member slidably mounted on the mandrel for longitudinal movement relative to the first abutment member, the second abutment member having an outwardly flaring flange forming surface facing the first abutment member, and means comprising cooperating elements on the mandrel and in the second abutment member for moving it towards the first abutment member.

3. Apparatus for making a hose having an integral outwardly extending flange at each end thereof, comprising: a mandrel over which a vulcanizable rubber like hose may be disposed with the mandrel in engagement with the inner wall of the hose at opposite ends thereof, a first abutment member slideable on the mandrel in a direction axially thereof having an outwardly flaring flange forming surface surrounding the mandrel adapted to abut one end of the hose and distort the hose wall adjacent said end, outwardly onto the outwardly flaring surface, means for limiting the slideable movement of said member in a direction away from said end of the hose, a second abutment member having a similar outwardly flaring surface, positioned on the mandrel and removable therefrom whereby the hose may be slid onto the mandrel, and means comprising a threaded connection between the mandrel and said second abutment member for effecting movement of the said second abutment member toward the first named member, whereby a hose of predetermined length disposed between the members may be shortened in over all length as the flanges are formed thereon.

4. An apparatus in accordance with claim 1 in which the second abutment member has an outwardly flaring flange forming surface facing the first abutment member whereby both ends of a hose section can be simultaneously flared.

5. An apparatus in accordance with claim 1 in which the mandrel is provided intermediate its ends with a bulged portion of greater diameter than the inside diameter of the hose wherefore the latter will be formed with a corresponding bulged section.

6. An apparatus in accordance with claim 4 in which the mandrel is provided intermediate its ends with a bulged portion of greater diameter than the inside diameter of the hose wherefore the latter will be formed with a corresponding bulged section.

7. An apparatus in accordance with claim 2 in which the mandrel has a section of enlarged diameter between the abutments forming a bulge.

8. An apparatus in accordance with claim 3 in which the flange forming surfaces terminate in forwardly extending cylindrical surfaces against which the ends of the flared hose abut to provide a smooth cylindrical edge.

References Cited in the file of this patent

UNITED STATES PATENTS

| | | |
|---|---|---|
| 529,216 | Tatham | Nov. 13, 1894 |
| 1,798,798 | Leguillon | Mar. 31, 1931 |
| 2,347,101 | Harding | Apr. 18, 1944 |
| 2,395,144 | Stivason | Feb. 19, 1946 |
| 2,503,934 | Church | Apr. 11, 1950 |